(No Model.)

E. K. HILL.
TENSION FOR TWINE BINDERS.

No. 369,710. Patented Sept. 13, 1887.

WITNESSES
J. L. Strong
B. F. Eibler

INVENTOR
E. K. Hill
W. H. Burridge
Atty

United States Patent Office.

ELWIN K. HILL, OF JEFFERSON, OHIO.

TENSION FOR TWINE-BINDERS.

SPECIFICATION forming part of Letters Patent No. 369,710, dated September 13, 1887.

Application filed September 25, 1886. Serial No. 214,492. (No model.)

*To all whom it may concern:*

Be it known that I, ELWIN K. HILL, of Jefferson, in the county of Ashtabula and State of Ohio, have invented a certain new and Improved Tension for Twine-Binders Attached to Harvesters, for use in connection with the binding mechanism; and I do hereby declare that the following is a full, clear, and complete description thereof.

The nature of my invention consists in the construction and arrangement of a stand or frame in which rollers are journaled, preferably of an elastic material, connected with which are also a spring and a set-screw, to cause more or less tension or pressure upon the said spring, and a consequent greater or less compression on the twine in passing through between the rollers to the devices for binding up the gavels of grain into sheaves as it is cut by the harvester.

In the ordinary mode of obtaining the tension the twine becomes twisted or coiled up on entering the tension mechanism, which so knots up the twine that it will not render through the tension, but will break off at that place if the machine is not stopped to relieve the knotted and twisted twine from the tension device or by so adjusting the said tension mechanism as to allow the knotted twine to pass during the time the mechanism is at rest, while after the knotted twine has passed through the tension of the ordinary construction the said twine will untwist and thereby pull apart or break the line in two. In this case the harvester must again be stopped and the twine rethreaded and connected with the needle that the machine may proceed with its work as before. The sheaves are also liable to become unbound by the separation of the untwisted twine or by breaking.

The practical objections are avoided in my improvement, by the use of which short lengths of twine knotted together may be used, as the knots will pass through between the yielding tension-rollers. This tying together of short pieces of twine and using them in binding utilizes an amount of material wasted in the old forms of tension, which will not admit of such knotted twine passing through, while with my improvement a lower grade and less expensive twine may be used than can be in the ordinary tensions.

That the full scope of my invention may be seen and understood in its construction and operation, the following specification is to be referred to, in connection with the annexed drawings, making part of the same, in which—

Figure 1:
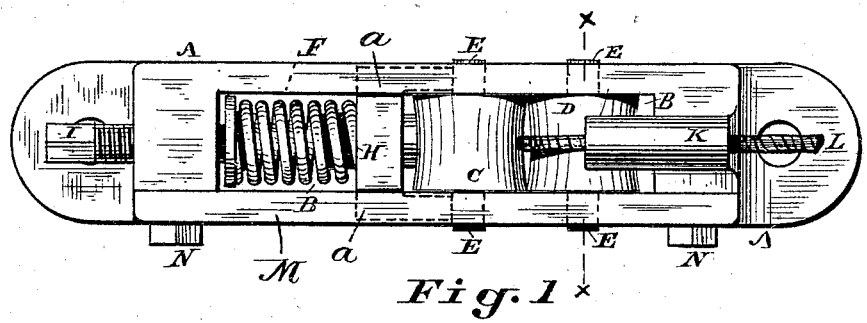
Figure 2:
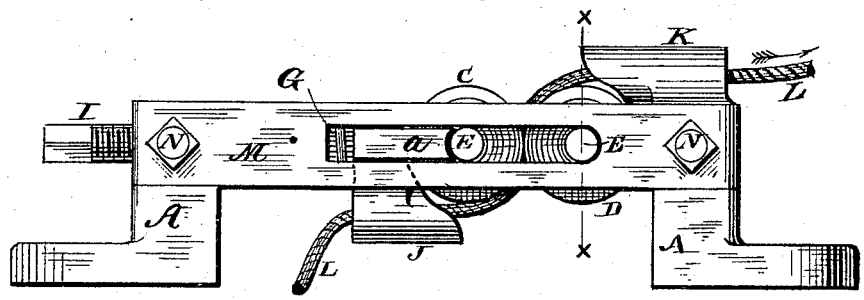
Figure 3:
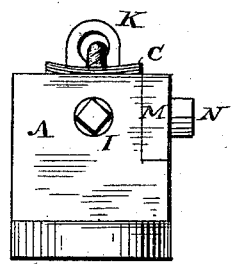

Figure 1 is a top view of the improved tension for twine-binders. Fig. 2 is a side view; Fig. 3, an end view; and Fig. 4, a vertical section in direction of the line $xx$, Figs. 1 and 2.

Like letters of reference designate like parts in the drawings and specification.

Figure 4:
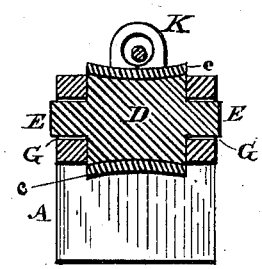

A, Figs. 1 and 2, represents the stand or frame of the tension mechanism. In the central part of the stand between the sides is an elongated opening, B, in which is a pair of rolls, C D, having journals E E, which are supported and have their bearings in a slot, G, in each side of the stand, as indicated in Figs. 2 and 4. The roller D has its bearing in the end of the slot, and the roller C has its bearing at the ends $a$ $a$ of the cross-head H. These ends $a$ $a$, as indicated in Figs. 1 and 2, are connected to the cross-head H. From the cross-head projects a stud which receives and supports the end of the spring F. The opposite end of the said spring is in contact with the head of the adjusting-screw I. By means of the spring and screw more or less compression may be given to the rollers, according to the character of the twine or cord used and the tension required in binding.

The rollers may be of any suitable elastic or non-elastic materials, and, if non-elastic, should have their surfaces, which may be either straight or concave, covered with some suitable elastic material. These features are shown in vertical section in Fig. 4, $c$ denoting the elastic covering.

On the under side of the stand is a twine-guide, J, depending from the cross-head, and on the upper side is also a twine-guide, K, which extends from the end of the stand partially over the roller D. The twine is reeved through these two guides J and K from the spool or ball to the needle, or to other suitable devices employed for tying up the grain into bundles. As the twine is reeved through the guide, it passes between the rollers C D, as shown in Fig. 2. On compressing the rollers by means of the screw I and spring F the required tension may be given to the twine as it passes between the rollers to the binding and tying mechanism on the harvester. As the rollers are elastic or have an elastic covering, the knots will pass between them readily. The spring bearings and elastic nature of the rollers, in connection with the guides J K, prevent the twine from twisting and knotting up, as in the ordinary tension mechanism.

The arrangement of the rolls in connection with the guides admits of the twine, L, passing from the ball or reel through the tension mechanism in the direction of the arrow, Fig. 2, or in an opposite direction to the devices for tying up the gavels of grain gathered by the harvester.

This improved tension mechanism is not designed for any special harvester or binding mechanism, as it may be applied to various kinds of machines for harvesting and binding the grain.

The purpose of the invention is to avoid the knotting, twisting up, and breaking of the twine in binding grain gathered by the harvester, and thereby preventing delay in harvesting and the sheaf from becoming unbound by the broken or untwisted twine tie.

The side piece, M, is attached by means of bolts N to the stand after the rolls, cross-head, and spring are placed in position to secure them in place within the opening B, as shown.

The face c of the rollers may consist of any suitable elastic material with straight or curved faces without departing from the nature of my invention.

What I claim as my invention, and desire to secure by Letters Patent, is—

In a twine-tension for grain-binders, the combination of a bracket, frame, or stand, its side pieces provided with longitudinal slots, the two rollers, the gudgeons of one roller bearing in the ends of said slots, a cross-head sliding in the slotted frame and having arms bearing on the gudgeons of the other roller, a spiral spring bearing on the cross-head and a set-screw in the stand or frame for adjusting said spring, a tubular twine-guide attached to and moving with said cross-head and located below the axis of and centrally with the rollers, and another twine-guide above the axis of said rollers attached to the stand on the opposite side of the rollers from the movable guide, substantially as shown, and for the purpose described.

In testimony whereof I affix my signature in presence of two witnesses.

ELWIN K. HILL.

Witnesses:
W. H. BURRIDGE,
B. F. EIBLER.